G. W. BROWN.
TIRE COVER AND FASTENING THEREFOR.
APPLICATION FILED SEPT. 23, 1907.
931,674.
Patented Aug. 17, 1909.
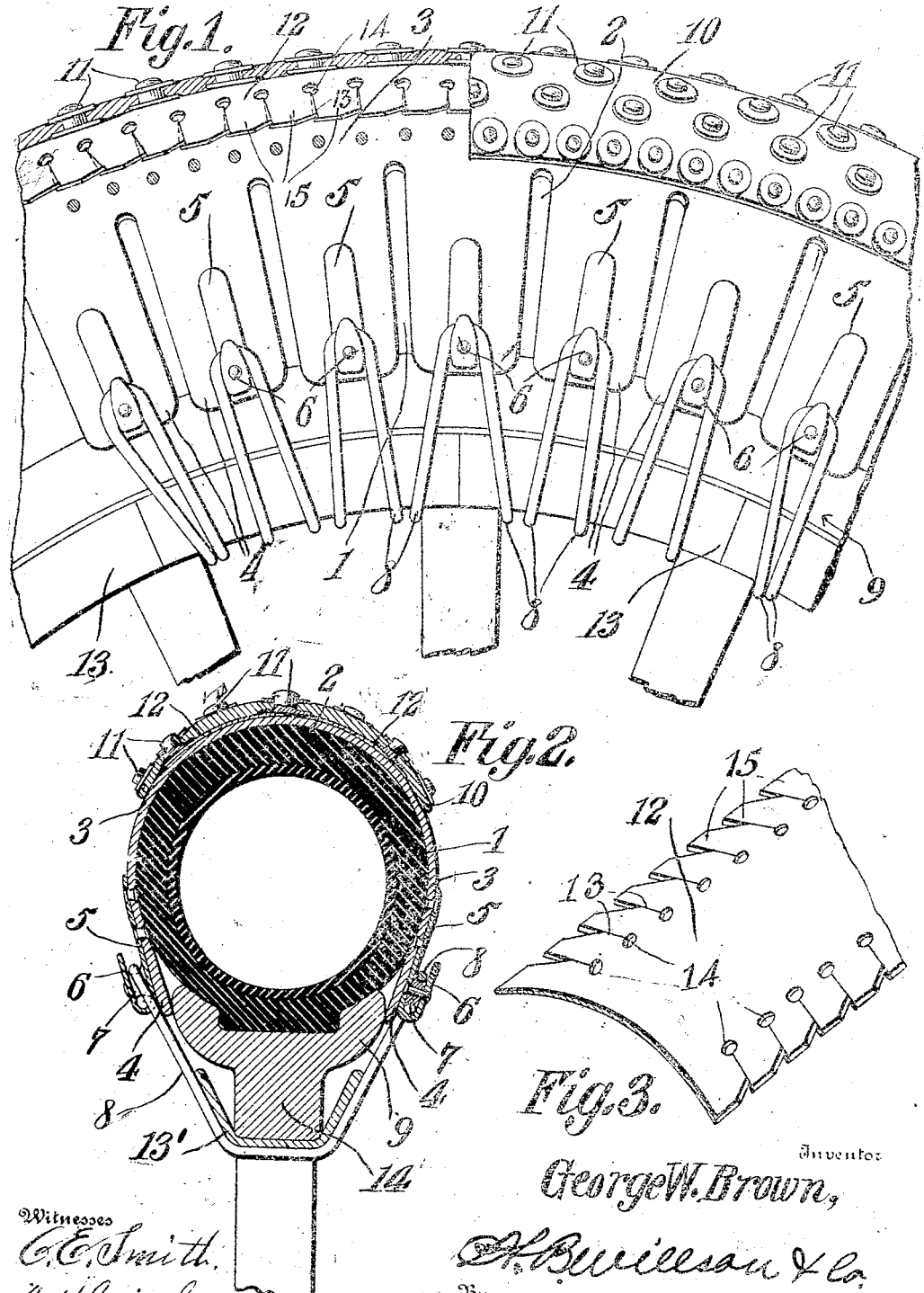
Witnesses
C. E. Smith.
C. H. Griesbauer.
Inventor
George W. Brown,
By H. B. Willson & Co.
Attorneys

UNITED STATES PATENT OFFICE.

GEORGE W. BROWN, OF JUNCTION CITY, KANSAS.

TIRE-COVER AND FASTENING THEREFOR.

No. 931,674.

Specification of Letters Patent. Patented Aug. 17, 1909.

Application filed September 23, 1907. Serial No. 394,163.

*To all whom it may concern:*

Be it known that I, GEORGE W. BROWN, a citizen of the United States, residing at Junction City, in the county of Geary and State of Kansas, have invented certain new and useful Improvements in Tire-Covers and Fastenings Therefor; and I do declare the following to be a full, clear, and exact description of the invention, such as will enable others skilled in the art to which it appertains to make and use the same.

This invention has relation to new and useful improvements in tire covers and fastenings therefor, especially adapted for use in connection with automobile tires.

The object of the invention is the production of a simple and economical tire cover, that will be absolutely puncture proof, will prevent skidding or slipping of the vehicle to the tires of which it is applied, and to provide improved fastening means, whereby such cover may be readily and easily fastened in position.

With this and other objects in view, the invention consists of certain novel features of construction, combination and arrangement of parts, as will be more fully described and particularly pointed out in the appended claim.

In the accompanying drawings: Figure 1 is a view in side elevation of a portion of a vehicle wheel with a tire cover constructed in accordance with the invention, positioned thereon, a portion of the outer cover member being broken away to more advantageously illustrate the invention; and Fig. 2 is a cross-sectional view. Fig. 3 is a detailed perspective view on an enlarged scale of a section of a protecting plate employed in connection with the invention.

In the accompanying drawings, which are for illustrative purposes only and therefore not drawn to any particular scale, the numeral 1 indicates a tire, and 2 a tire cover. This tire cover comprises an inner tire cover member, comprising a body, 3, adapted to be arranged over and entirely cover the tread portion of the tire, the body having radially projecting spaced flaps, 4, extending inwardly from each side edge entirely around its circumference, said flaps being adapted to embrace opposite sides of the tire when the cover is positioned thereon. Supporting plates or members, 5, are riveted or otherwise fastened to the outer faces of the flaps or members, 4, longitudinally thereof, and are bent or turned outwardly at their inner ends to form outwardly projecting portions, 6, between which and the body portions of said plates are journaled pulleys, 7.

In practice, the tire cover is removably fastened in position by a flexible fastening string or element, 8, fastened at one end to the inner end of one of the fastening plates or members, 5 and passing alternately in opposite directions across the rim, 9, of the vehicle wheel and over the pulleys, 7. An outer flexible cover member, 10, is riveted or otherwise securely fastened at its side edges to the side edges of the body of the inner tire member, and is provided with outwardly projecting rivets, 11, or other form of anti-slipping devices, to prevent the wheels of the vehicle from slipping or skidding in passing over smooth or wet surfaces. A protective metallic plate, 12, is arranged between the outer and inner tire cover members and extends entirely around the tire to prevent puncturing of the same. Each side edge of this plate is slit preferably at points equal distances apart entirely around the circumference of said plate as at 13, and is apertured at the inner ends of said split portions, as at 14, to produce a circumferential series of radially projecting contiguous resilient flaps 15 at each side edge of the plate to give the side edges of the same a certain resiliency, the purpose of which will be evident. A flexible member, 13', is arranged over the felly, 14', of the rim to provide a good gripping surface for the fastening element and to protect it against cutting by the edges of the rim, said flexible member being apertured and slitted, from one of its side edges to said apertures so that it may receive the spokes of the wheel.

From the foregoing description taken in connection with the accompanying drawings, the construction and operation of the invention will be readily understood without requiring a more extended explanation.

Having thus described my invention, what I claim as new and desire to secure by Letters Patent, is:

A tire cover and fastening therefor, comprising a cover with a body portion adapted to be arranged over and entirely cover the tread portion of the tire of the wheel, said body portion having radially projecting spaced flaps, supporting plates riveted to the outer faces of the flaps, said plates having their terminals bent in hook form and having pulleys arranged to rotate therein, fastening strings passing alternately in opposite directions across the rim of the wheel and over said pulleys, a flexible member contacting with said fastening strings and arranged over the felly of the rim of said wheel to provide a gripping surface for said fastening strings, an outer flexible cover secured to the body of the inner tire and having straight continuous rows of projecting rivets on opposite side edges and said cover being also provided with projecting rivets between those on the edges thereof which are arranged in staggered form thereon, and an anti-puncture plate arranged between the flexible cover and the inner tire, substantially as specified.

In testimony whereof I have hereunto set my hand in presence of two subscribing witnesses.

GEORGE W. BROWN.

Witnesses:
MONTGOMERY HARRIS,
F. A. DURAND.